US012560323B2

(12) United States Patent
Joshi

(10) Patent No.: US 12,560,323 B2
(45) Date of Patent: Feb. 24, 2026

(54) APPARATUS AND METHOD FOR AIR PARTICLE CAPTURE IN A GAS TURBINE ENGINE

(71) Applicant: RTX Corporation, Farmington, CT (US)

(72) Inventor: Dibesh D. Joshi, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/121,286

(22) Filed: Mar. 14, 2023

(65) Prior Publication Data

US 2024/0310047 A1 Sep. 19, 2024

(51) Int. Cl.
| | |
|---|---|
| *F23R 3/00* | (2006.01) |
| *F02C 7/24* | (2006.01) |
| *F02C 7/30* | (2006.01) |

(52) U.S. Cl.
CPC .............. *F23R 3/002* (2013.01); *F02C 7/24* (2013.01); *F02C 7/30* (2013.01); *F05D 2220/32* (2013.01); *F05D 2240/35* (2013.01); *F05D 2260/231* (2013.01); *F05D 2260/95* (2013.01)

(58) Field of Classification Search
CPC .... F23R 3/002; F23R 3/04; F23R 3/42; F23R 3/425; F23R 3/44; F23R 3/46; F23R 3/50; F23R 3/52; F23R 3/54; F23R 3/58; F23R 2900/00004; F23R 2900/03045
See application file for complete search history.

(56) References Cited

U.S. PATENT DOCUMENTS

| | | | | |
|---|---|---|---|---|
| 4,269,032 | A | * | 5/1981 | Meginnis ................ F23R 3/002 |
| | | | | 60/754 |
| 4,296,606 | A | | 10/1981 | Reider |
| 6,341,485 | B1 | | 1/2002 | Liebe |
| 11,187,413 | B2 | | 11/2021 | Clum et al. |
| 2017/0356653 | A1 | * | 12/2017 | Bagchi .................... F23R 3/002 |
| 2019/0063749 | A1 | | 2/2019 | Zelesky et al. |
| 2019/0086084 | A1 | * | 3/2019 | Clum ........................ F23R 3/04 |
| 2019/0162080 | A1 | | 5/2019 | Lamson |
| 2020/0182470 | A1 | | 6/2020 | Kramer et al. |

OTHER PUBLICATIONS

Extended European Search Report for EP Application No. 24162644.8; Issue Date, Jul. 30, 2024.

* cited by examiner

*Primary Examiner* — Scott J Walthour
(74) *Attorney, Agent, or Firm* — CANTOR COLBURN LLP

(57) ABSTRACT

A combustor for a gas turbine engine, including: a heat shield panel attached to a combustor liner, the combustor liner having a plurality of primary apertures extending through the combustor liner and the heat shield panel having a plurality of apertures extending therethrough; an intermediary layer located between the combustor liner and the heat shield panel, the intermediary layer being spaced from the combustor liner and the intermediary layer being spaced from the heat shield panel, the intermediary layer including a plurality of secondary apertures extending through the intermediary layer, the plurality of apertures, the plurality of primary apertures and the plurality of secondary apertures each being in fluid communication with each other; and a plurality of pins extending upwardly and away from a surface of the intermediary layer towards a surface of the combustor liner.

20 Claims, 6 Drawing Sheets

APPARATUS AND METHOD FOR AIR PARTICLE CAPTURE IN A GAS TURBINE ENGINE

BACKGROUND

This disclosure relates generally to gas turbine engines, and more particularly to methods and apparatus for mitigating particulate accumulation on cooling surfaces of components of gas turbine engines.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

In one example, a combustor of a gas turbine engine may be configured and required to burn fuel in a minimum volume. Such configurations may place substantial heat load on a structure of the combustor (e.g., panels, shell, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields or panels. Particulates in the air used to cool these structures may inhibit cooling of the heat shields and reduce durability. Particulates, in particular atmospheric particulates, include solid or liquid matter suspended in the atmosphere such as dust, ice, ash, sand and dirt.

BRIEF DESCRIPTION

Disclosed is a combustor for a gas turbine engine, including: a heat shield panel attached to a combustor liner, the combustor liner having a plurality of primary apertures extending through the combustor liner and the heat shield panel having a plurality of apertures extending therethrough: an intermediary layer located between the combustor liner and the heat shield panel, the intermediary layer being spaced from the combustor liner and the intermediary layer being spaced from the heat shield panel, the intermediary layer including a plurality of secondary apertures extending through the intermediary layer, the plurality of apertures, the plurality of primary apertures and the plurality of secondary apertures each being in fluid communication with each other; and a plurality of pins extending upwardly and away from a surface of the intermediary layer towards a surface of the combustor liner.

In addition to one or more of the features described above, or as an alternative to any of the foregoing embodiments, the heat shield panel and the intermediary layer are removably mounted to the combustor liner by one or more attachment mechanisms.

In addition to one or more of the features described above, or as an alternative to any of the foregoing embodiments, the one or more attachment mechanisms are integrally formed with the heat shield panel.

In addition to one or more of the features described above, or as an alternative to any of the foregoing embodiments, the one or more attachment mechanisms are a bolt that extends from the heat shield panel through the intermediary layer and into a receiving portion or aperture of the combustor liner.

In addition to one or more of the features described above, or as an alternative to any of the foregoing embodiments, the combustor defines a combustion chamber, the combustion chamber including a combustion area within the combustion chamber and the heat shield panel partially enclose the combustion area within the combustion chamber of the combustor.

In addition to one or more of the features described above, or as an alternative to any of the foregoing embodiments, the combustor includes an inlet and an outlet through which air may pass.

In addition to one or more of the features described above, or as an alternative to any of the foregoing embodiments, the plurality of pins are arranged in an array on the surface of the intermediary layer.

In addition to one or more of the features described above, or as an alternative to any of the foregoing embodiments, a gap is located between a top of the plurality of pins and the first surface of the combustor liner.

In addition to one or more of the features described above, or as an alternative to any of the foregoing embodiments, the plurality of pins are arranged in an array on the surface of the intermediary layer.

Also disclosed is a gas turbine engine, including: a compressor section; a combustor fluidly connected to the compressor section: a turbine section fluidly connected to the combustor, the combustor including: a heat shield panel attached to a combustor liner, the combustor liner having a plurality of primary apertures extending through the combustor liner and the heat shield panel has a plurality of apertures extending therethrough: an intermediary layer located between the combustor liner and the heat shield panel, the intermediary layer being spaced from the combustor liner and the intermediary layer being spaced from the heat shield panel, the intermediary layer including a plurality of secondary apertures extending through the intermediary layer, the plurality of apertures, the plurality of primary apertures and the plurality of secondary apertures each being in fluid communication with each other; and a plurality of pins extending upwardly and away from a surface of the intermediary layer towards a surface of the combustor liner.

In addition to one or more of the features described above, or as an alternative to any of the foregoing embodiments, the heat shield panel and the intermediary layer are removably mounted to the combustor liner by one or more attachment mechanisms.

In addition to one or more of the features described above, or as an alternative to any of the foregoing embodiments, the one or more attachment mechanisms are integrally formed with the heat shield panel.

In addition to one or more of the features described above, or as an alternative to any of the foregoing embodiments, the one or more attachment mechanisms are a bolt that extends from the heat shield panel through the intermediary layer and into a receiving portion or aperture of the combustor liner.

In addition to one or more of the features described above, or as an alternative to any of the foregoing embodiments, the combustor defines a combustion chamber, the combustion chamber including a combustion area within the combustion chamber and the heat shield panel partially enclose the combustion area within the combustion chamber of the combustor.

In addition to one or more of the features described above, or as an alternative to any of the foregoing embodiments, the combustor includes an inlet and an outlet through which air may pass.

In addition to one or more of the features described above, or as an alternative to any of the foregoing embodiments, the plurality of pins are arranged in an array on the surface of the intermediary layer.

In addition to one or more of the features described above, or as an alternative to any of the foregoing embodiments, a gap is located between a top of the plurality of pins and the first surface of the combustor liner.

In addition to one or more of the features described above, or as an alternative to any of the foregoing embodiments, the plurality of pins are arranged in an array on the surface of the intermediary layer.

Also disclosed is a method for capturing dirt particles in a combustor of a gas turbine engine, including: securing a heat shield panel of the combustor to a combustor liner of the combustor, the combustor liner having a plurality of primary apertures extending through the combustor liner and the heat shield panel has a plurality of apertures extending therethrough: securing an intermediary layer between the combustor liner and the heat shield panel, the intermediary layer being spaced from the combustor liner and the intermediary layer being spaced from the heat shield panel, the intermediary layer including a plurality of secondary apertures extending through the intermediary layer, the plurality of apertures, the plurality of primary apertures and the plurality of secondary apertures each being in fluid communication with each other; and capturing dirt particles with a plurality of pins extending upwardly and away from a surface of the intermediary layer towards a surface of the combustor liner.

In addition to one or more of the features described above, or as an alternative to any of the foregoing embodiments, the plurality of pins are arranged in an array on the surface of the intermediary layer.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
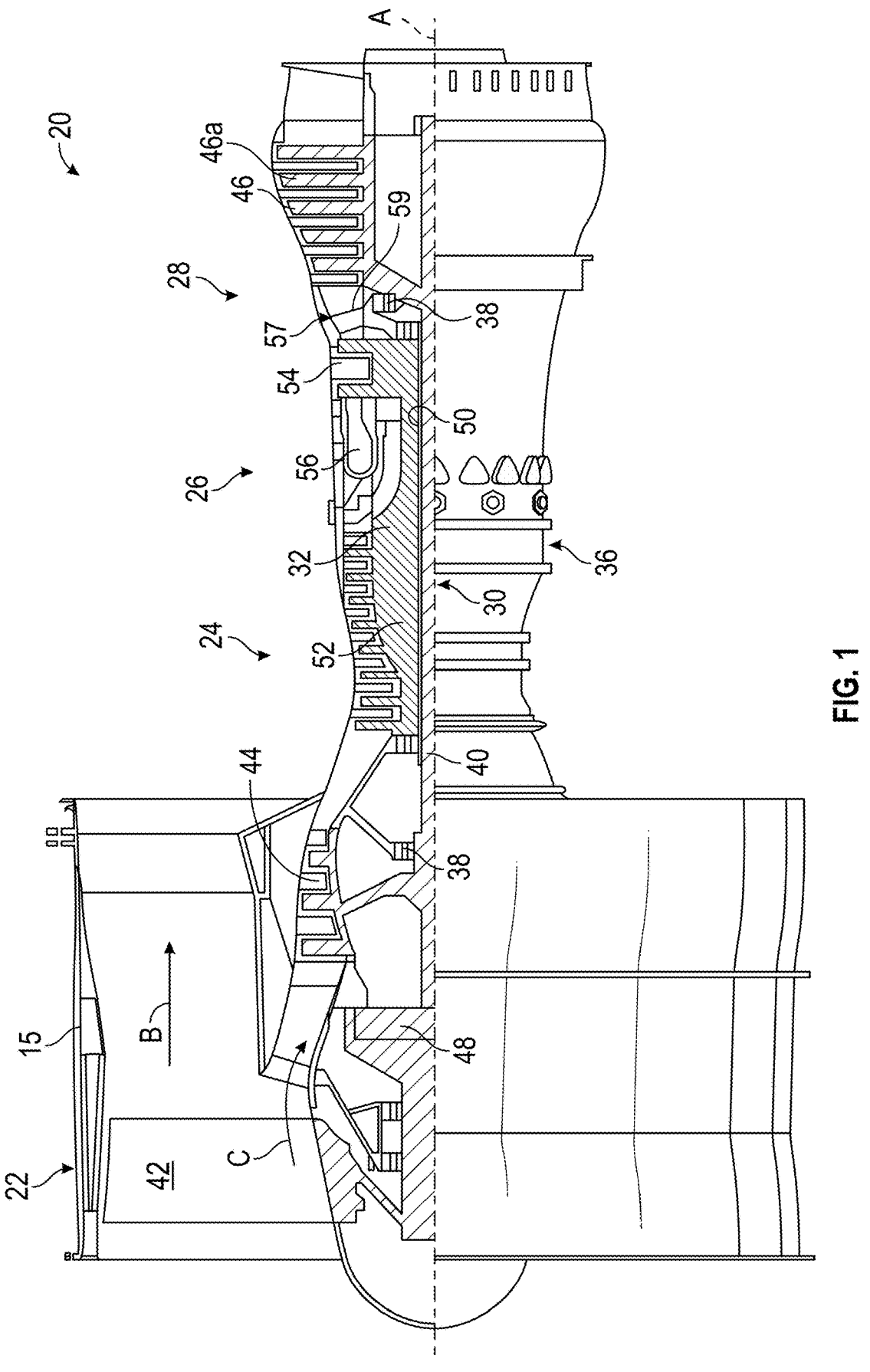
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150 ft/second (350.5 m/sec).

In one non-limiting example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at 46a. In a further non-limiting example the low pressure turbine 46 includes about 3 turbine rotors. A ratio between the number of blades of the fan 42 and the number of low pressure turbine rotors 46a is between about 3.3 and about 8.6. The example low pressure turbine 46 provides the driving power to rotate the fan section 22 and therefore the relationship between the number of turbine rotors 46a in the low pressure turbine 46 and the number of blades in the fan section 22 discloses an example gas turbine engine 20 with increased power transfer efficiency.

Figure 2:
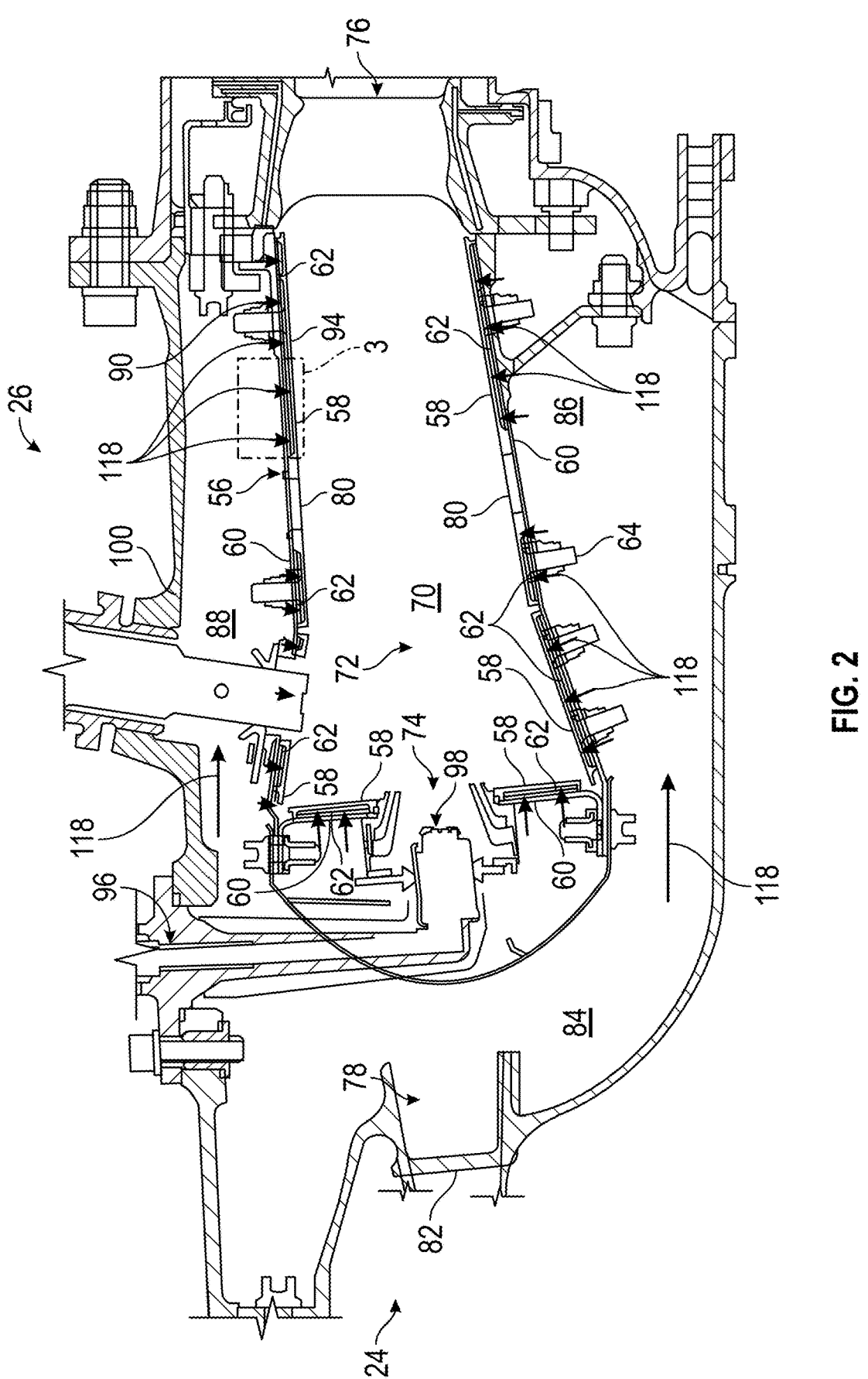
FIG. 2 is a schematic cross-sectional view of a combustor of the gas turbine engine in accordance with the present disclosure.
Figure 3:
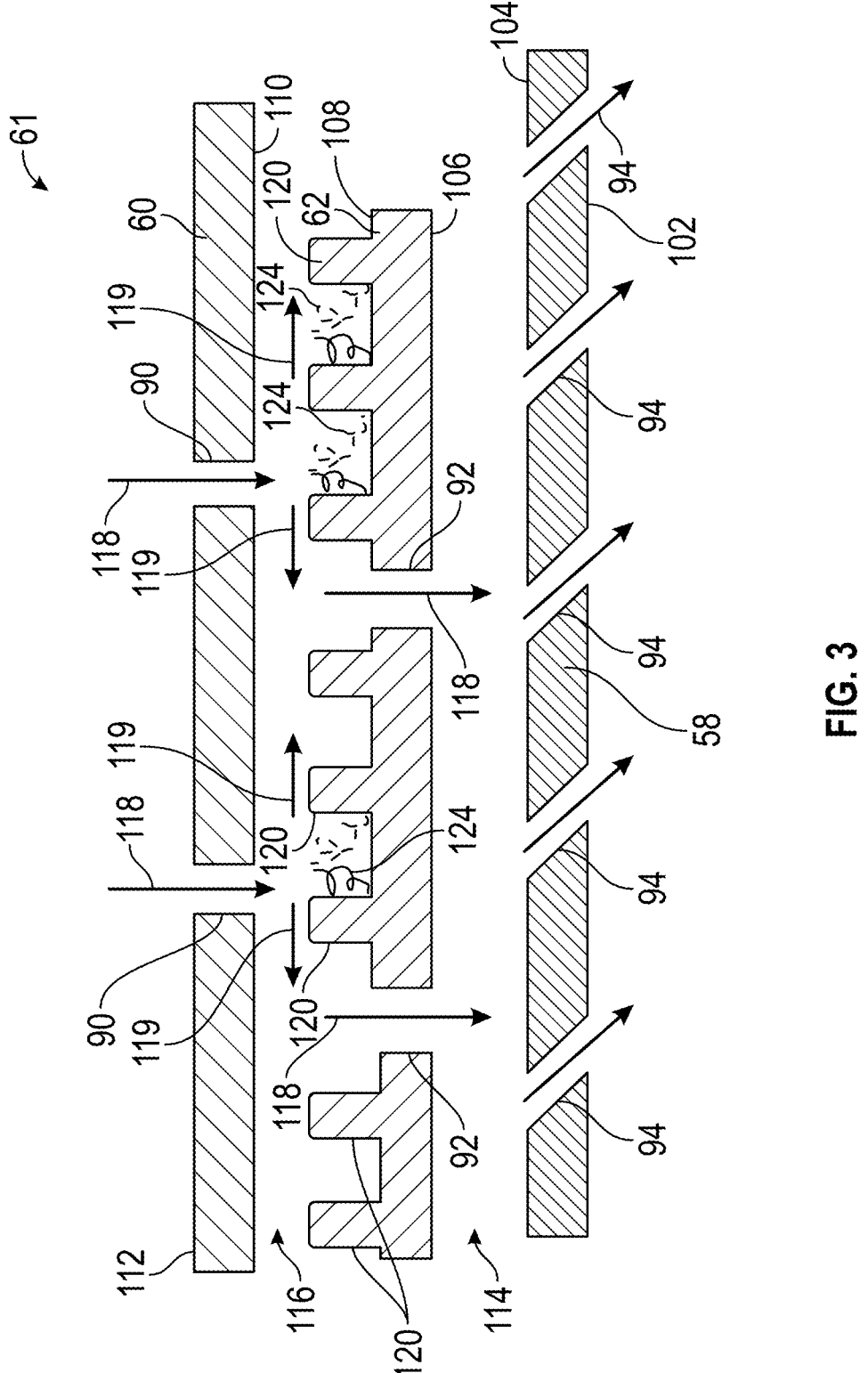
FIG. 3 is a cross-sectional view of a portion of the combustor illustrated in FIG. 2.
Figures 4, 4A:
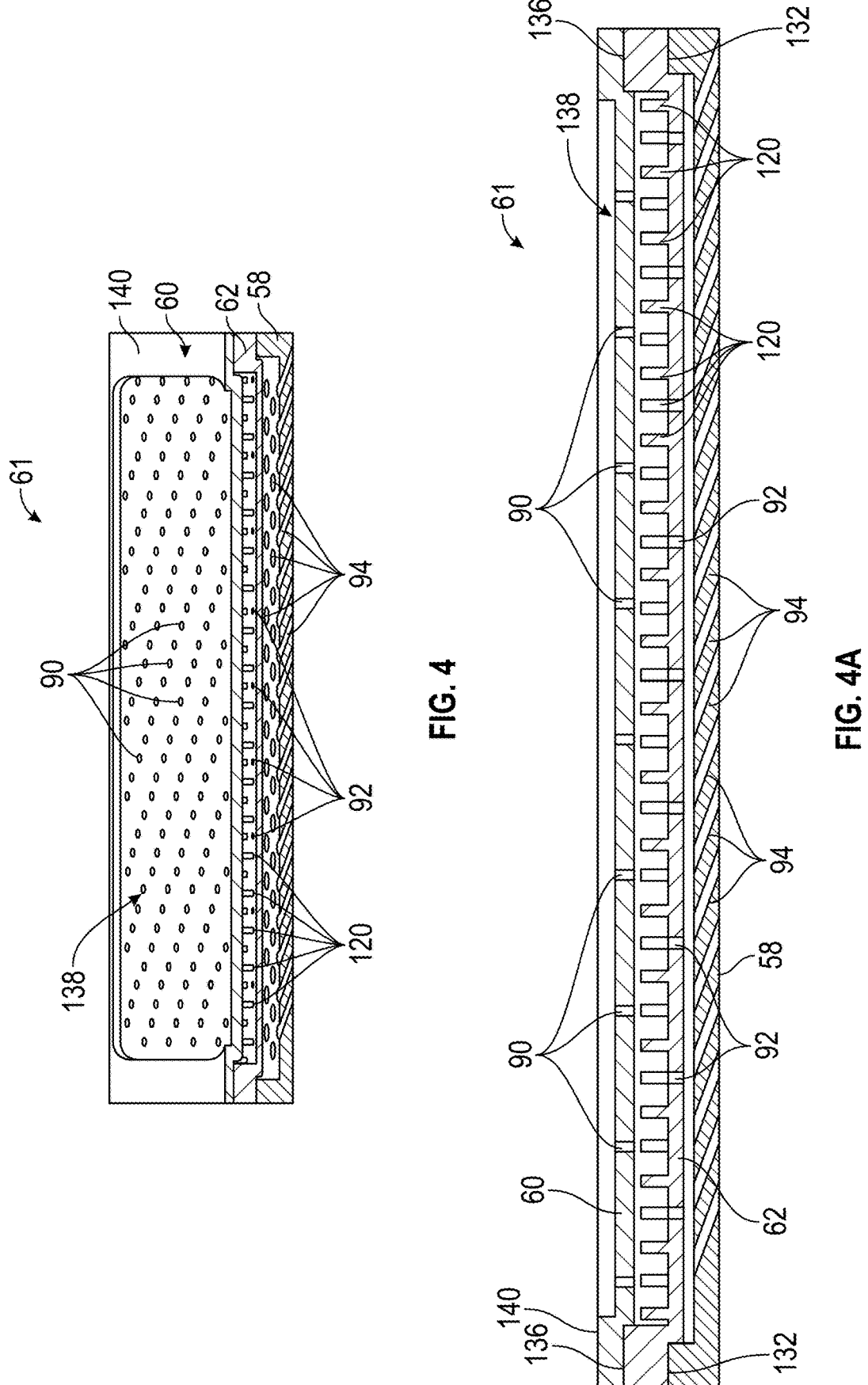
FIG. 4 is a perspective partial cross-sectional view of the portion of the combustor illustrated in FIGS. 2 and 3.
FIG. 4A is a cross-sectional view of the portion of the combustor illustrated in FIG. 4.
Figure 5:
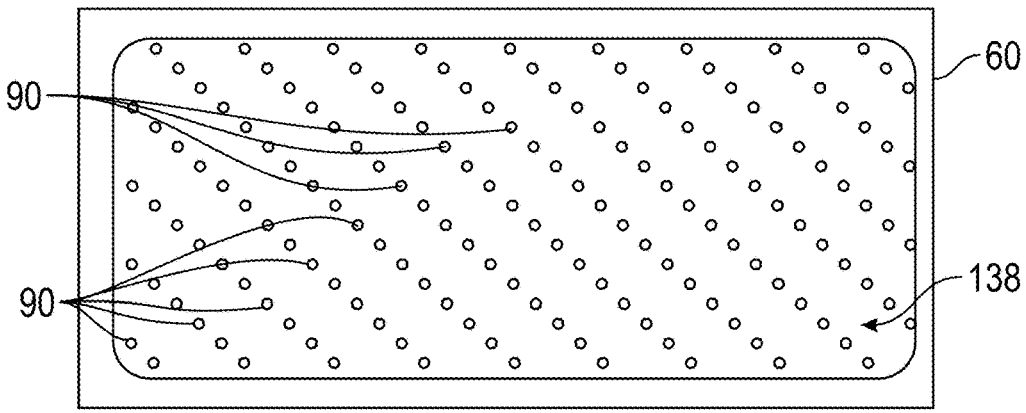
FIG. 5 is top view of a top layer of a portion of a combustor constructed in accordance with the present disclosure.

Referring now to FIG. 2, and with continued reference to FIG. 1, a portion of the combustor section 26 of the gas turbine engine 20 is illustrated. As illustrated in FIG. 2, the combustor 56 includes multiple heat shield panels 58 that each are attached to a combustor liner 60, which may also be referred to as an impingement sheet. Multiple combustor liners 60 and heat shield panels 58 may be used to form the periphery or outer perimeter of the combustor 56. This may also be referred to an impingement film floatwall (IFF) assembly when combined with impingement passages and effusion passages. In accordance with the present disclosure and in some areas of the combustor an intermediary layer 62 is located between at least one heat shield panel 58 and one of the combustor liners 60, which may be referred to as an assembly 61. In one non-limiting embodiment, the combustor liner 60 is formed from an INCONEL alloy or the same alloy as the heat shield panels and the intermediary layer 62 may also be formed from an INCONEL alloy and could be coated or uncoated. If coated, the intermediary layer 62 may be coated with an electron beam physical vapor deposition (EBPVD) ceramic coating. The heat shield panels 58 may also be formed from an INCONEL alloy that is coated with an electron beam physical vapor deposition (EBPVD) ceramic coating. Of course, other equivalent materials and coatings are considered to be within the scope of the present disclosure.

The intermediary layer 62 is spaced from the combustor liner 60 and the heat shield panel 58. The combustor liners 60 can define circular or annular structures with the heat shield panels 58 and intermediary layers 62 being mounted on radially inward liners 60 and radially outward liners 60, as will be appreciated by those of skill in the art. As used herein, radially inward refers to a direction towards the engine central longitudinal axis A and radially outward refers to a direction away from the engine central longitudinal axis A. As such, radially inward liners 60 are closer to the engine central longitudinal axis A than the radially outward liners 60, when the combustor 56 is installed in the gas turbine engine 20.

The heat shield panels 58 and intermediary layers 62 can be removably mounted to the combustor liners 60 by one or more attachment mechanisms 64. In some embodiments, the attachment mechanism 64 may be integrally formed with a respective heat shield panel 58, although other configurations are possible. In some embodiments, the attachment mechanism 64 may be a bolt or other structure that may extend from the respective heat shield panel 58 through the intermediary layer 62 to a receiving portion or aperture of the combustor liner 60 such that the heat shield panel 58 and the intermediary layer 62 may be attached to the combustor liner 60 and held in place.

The combustor 56 defines a combustion chamber 70. The combustion chamber 70 includes a combustion area 72 within the combustion chamber 70. The heat shield panels 58 partially enclose the combustion area 72 within the combustion chamber 70 of the combustor 56. The combustor 56 includes an inlet 74 and an outlet 76 through which air may pass. The air may be supplied to the combustor 56 by a pre-diffuser 78. Air may also enter the combustion area 72 of the combustion chamber 70 through other holes in the combustor 56 including but not limited to quench holes 80, as seen in FIG. 2.

As shown in FIG. 2, compressor air is supplied from a compressor section 24 into a pre-diffuser strut 82. As will be appreciated by those of skill in the art, the pre-diffuser strut 82 is configured to direct the airflow into the pre-diffuser 78, which then directs the airflow toward the combustor 56. The combustor 56 and the pre-diffuser 78 are separated by a shroud chamber 86 that contains the combustor 56 and includes an inner diameter branch 84 and an outer diameter branch 88. As air enters the shroud chamber 84 a portion of the air may flow into the combustor inlet 74, a portion may flow into the inner diameter branch 86, and a portion may flow into the outer diameter branch 88. As previously mentioned and in prior designs, dirt entrained in the air that is received from the compressor section 24 may be deposited on the heat shield panels 58 and this deposited dirt will adversely affect the impingement and effusion cooling of the heat shield panels 58 of the combustor 56.

Referring now to FIGS. 1-7A, the air from the inner diameter branch 86 and the outer diameter branch 88 may then enter the combustion area 72 of the combustion chamber 70 by means of one or more primary apertures 90 in the combustor liner 60 and one or more secondary apertures 92 in the intermediary layer 62 and one or more apertures 94 in the heat shield panels 58. In other words, the plurality of apertures, the plurality of primary apertures and the plurality of secondary apertures are in fluid communication with each other. The primary apertures 90, the secondary apertures 92 and the one or more apertures 94 may include nozzles, holes, etc. In particular, the apertures 94 may comprise shaped effusion outlets. The air may then exit the combustion chamber 70 through the combustor outlet 76. At the same time, fuel may be supplied into the combustion chamber 70 from a fuel injector 96 and a pilot nozzle 98, which may be ignited within the combustion area 72 of the combustion chamber 70. The combustor 56 of the engine combustion section 26 may be housed within a shroud case 100 which may define the shroud chamber 84.

Referring now to FIGS. 3-7A and with continued reference to FIGS. 1 and 2, FIGS. 3-4A illustrate an enlarged portion of an assembly 61 of the heat shield panel 58, the intermediary layer 62 and the combustor liner 60 of the combustor 56 of the gas turbine engine 20. As illustrated, the heat shield panel 58, the intermediary layer 62 and the combustor liner 60 are each in a facing spaced relationship with respect to each other. The combustor 56 may have a plurality of assemblies 61 located about and defining peripheral or exterior portions of the combustor 56.

The heat shield panels 58 include a first surface 102 that is oriented towards the combustion area 72 of the combustion chamber 70 and a second surface 104 opposite the first surface 102. The second surface 104 of the heat panels 58 is orientated towards a first surface 106 of the intermediary layer 62 and a second surface 108 of the intermediary layer 62 is orientated towards a first surface 110 of the combustor liner 60 and a second surface 112 of the combustor liner 60 is opposite to the first surface of the combustor liner 60. The second surface 112 of the combustor liner 60 is oriented radially outward from the combustor 56 and faces the inner diameter branch 86 and/or the outer diameter branch 88. As illustrated and in one embodiment, the primary apertures 90 are not aligned with the secondary apertures 92 such that the airflow must travel in the direction of arrows 119 after exiting the primary apertures 90 and before it enters the secondary apertures 92 this will assist in slowing down the cross flow velocity of the air traveling from primary apertures 90 to the secondary apertures 92.

As mentioned above and as illustrated, the intermediary layer 62 is spaced from or in a facing spaced relationship with regard to the heat shields 58 and the combustor liner 60. In other words, the first surface 110 of the combustor liner 60 is spaced from the second surface 108 of the intermediary liner 62 and the first surface 106 of the intermediary liner 62 is spaced from the second surface of the heat shields 58. As such, a first cavity or plenum 114 is formed between the heat shields 58 and the intermediary layer 62 and a second cavity or plenum 116 is formed between the intermediary layer 62 and the combustor liner 60.

In addition and when referring to the heat shields 58, the intermediary layer 62 and the combustor liner 60 located at the radially inward and radially outward sides of the combustor (e.g., the heat shields 58, the intermediary layer 62 and the combustor liner 60 not located at the forward end of the combustor 56 proximate to the inlet 74) the first surface of the heat shields 58, the intermediary layer 62 and the combustor liner 60 may also be referred to as a radially inward surface and the second surface of the heat shields 58, the intermediary layer 62 and the combustor liner 60 may also be referred to as a radially outward surface.

As used herein, radially inward refers to a direction towards the engine central longitudinal axis A and radially outward refers to a direction away from the engine central longitudinal axis A. As such, the radially inward surface of the heat shields 58, the intermediary layer 62 and the combustor liner 60 is closer to the engine central longitudinal axis A than the radially outward surface of the heat shields 58, the intermediary layer 62 and the combustor liner 60, when the combustor 56 is installed in the gas turbine engine 20.

As mention above, the combustor liner 60 includes a plurality of primary apertures 90 configured to allow airflow illustrated by arrows 118 from the inner diameter branch 86 and the outer diameter branch 88 to enter second cavity or plenum 116, which may also be referred to as an impingement cavity 116 located in between the combustor liner 60 and the intermediary layer 62. Each of the primary apertures 90 extend from the second surface 112 of the combustor liner 60 to the first surface of the combustor liner 60. As such, each of the primary apertures 90 fluidly connects the impingement cavity 116 to at least one of the inner diameter branch 86 and the outer diameter branch 88.

Figure 6:
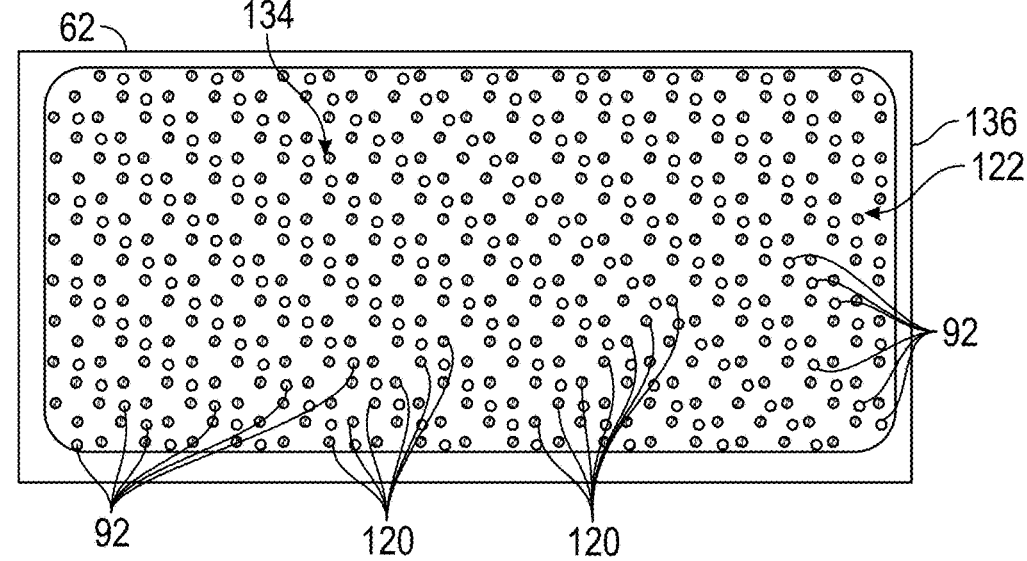
FIG. 6 is top view of an intermediate layer of a portion of a combustor constructed in accordance with the present disclosure.
Figure 6A:
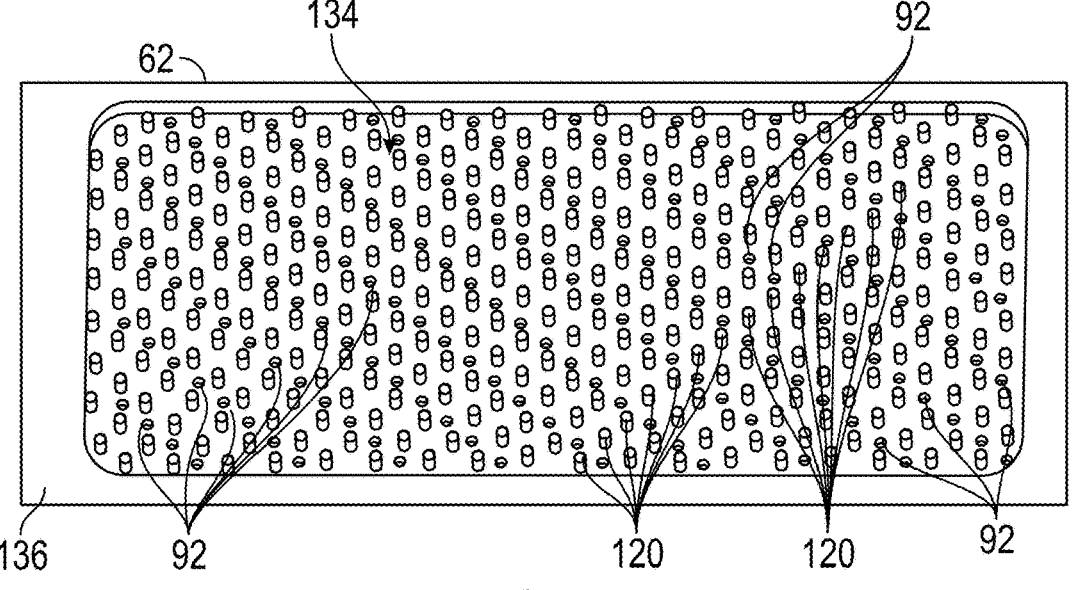
FIG. 6A is perspective view of the intermediate layer illustrated in FIG. 6.
Figure 7:
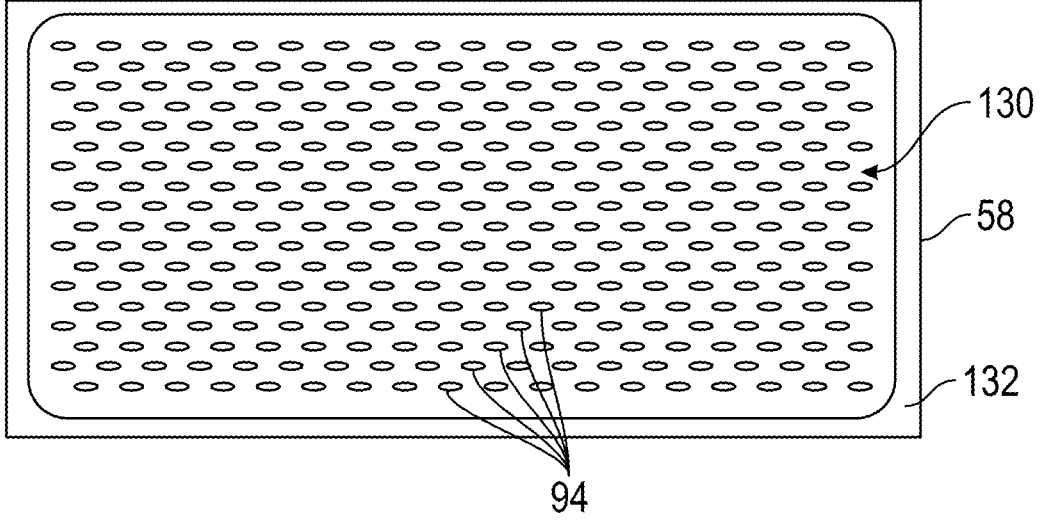
FIG. 7 is top view of a bottom layer of a portion of a combustor constructed in accordance with the present disclosure.
Figure 7A:
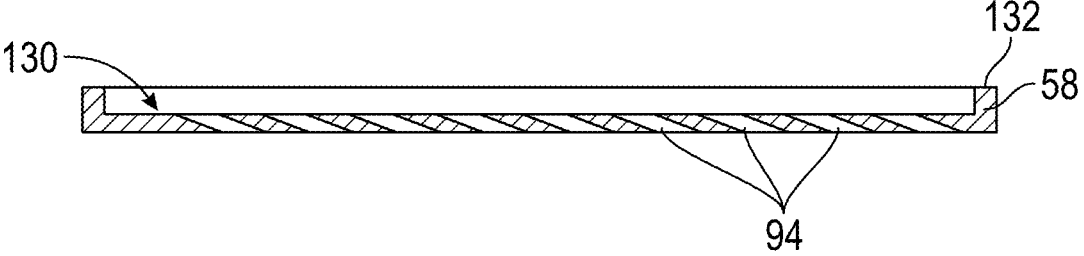
FIG. 7A is perspective view of the bottom layer illustrated in FIG. 7.

The intermediary layer 62 will also include a plurality of pins or protrusions 120 that extend upwardly and away from the second surface of the intermediary layer 62 towards the first surface 110 of the combustor liner. The plurality of pins 120 are separated from each other to define a pin-fin array 122 illustrated in at least FIGS. 6 and 6A. The pins 120 of the pin-fin array 122 will slow down a cross flow velocity of the air traveling in the direction of arrows 118 and 119 through openings 90 towards the second surface 108 of the intermediary layer 62. As such, this will promote deposition of particulate 124 entrained within the air on the intermediary layer 62. Particulate 124 may include but is not limited to dirt, smoke, soot, volcanic ash, or similar airborne particulates known to one of skill in the related art. In one non-limiting embodiment, the plurality of pins 120 are formed integrally with the intermediary layer 62 such that they are formed as a single unitary structure or alternatively the pins may be separately secured to the intermediary layer 62.

As illustrated and in one embodiment, the plurality of pins 120 do not extend all the way to the first surface 110 of the combustor liner 60. In other words, there is a gap between the top of the plurality of pins 120 and the first surface 110 of the combustor liner 60.

As illustrated, the particulate deposition may occur adjacent to the pins 120 since the airflow must be redirected around the pins 120 in order to flow through the openings 92 in the intermediary layer 62. The openings 92 extending through the intermediary layer 62 from the second surface 108 to the first surface 106.

Accordingly, the particulate 124 will be deposited on the second surface 108 of the intermediary layer 62 and thereafter the airflow will travel through openings 92, less the deposited particulate 124, into the first cavity or plenum 114 and then through openings 94 in the heat shield panels 58 to the combustion area 72 of the combustion chamber 70. The openings 94 extending through the heat shield panels from the second surface 104 to the first surface 102.

Airflow flowing into the first plenum 114 from the second plenum or impingement cavity 116 impinges on the second surface 104 of the heat shield panel 58 at impingement points and absorbs heat from the heat shield panel 58 as it impinges on the second surface 104.

Since the particulate 124 impinges upon the second surface 108 of the intermediary layer 62 it is less likely to collect on the second surface 104 of the heat shield panels 58 thereby improving the cooling efficiency of the airflow impinging upon the second surface 104 of the heat shield panel 58. Moreover, collecting particulate 124 upon the second surface 108 of the intermediary layer 62 as well as proximate to proximate to pins 120 this will reduce the likelihood of the particulate creating blockages anyone of the apertures 92 in the intermediary layer 62 and the apertures 94 in the heat shield panels 58.

Referring now to at least FIGS. 4-7A, additional views of the heat shield 58, the intermediary layer 62 and the combustor liner 60 are provided. As illustrated, each assembly 61 includes a stack of a heat shield 58, an intermediary layer 62 and a combustor liner 60. In one non-limiting embodiment, the heat shield 58 has a recessed area 130 in which the apertures 94 are located. The recessed area 130 is surrounded by a wall portion or edge 132. The wall portion or edge 132 supports the intermediary layer 62 when it is secured to the heat shield 58.

In addition and in one non-limiting embodiment, the intermediary layer 62 may have a recessed area 134 in which the openings 92 and the pins 120 are located. The recessed area 134 is surrounded by a wall portion or edge 136. The wall portion or edge 136 supports the combustor liner 60 when it is secured to the intermediary layer 62. Still further and in one non-limiting embodiment, the combustor liner 60 may also have a recessed area 138 in which the openings 90 are located. The recessed area 138 is surrounded by a wall portion or edge 140. It being understood that the attached FIGS. illustrate generic representations of a triple walled cooling design and other alternative configurations are considered to be with the scope of the present disclosure. For example, the combustor liner 60 could also have a flat surface without any recess area 138.

Accordingly, a triple walled cooling design concept for mitigation of dirt deposition in the combustor is provided in accordance with various embodiments of the present disclosure.

In addition, the disclosed cooling design promotes high velocity impingement onto the intermediary layer 62 with backside features or pins 120. The features or pins 120 slows down a cross flow velocity of the airflow entering the impingement cavity 116 and promotes dirt deposition in this layer. As such, a relatively cleaner airflow is then impinged upon to the heat shield 58.

The stacking of the intermediary layer 62 between the heat shields 58 and the combustor liner 60 could allow control of plenum pressure in the first cavity 114 for cooling of the heat shields 58. The configuration illustrated herein also helps to maintain desired pressure drops and thus higher heat transfer through apertures 94 in the heat shields 58.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A combustor for a gas turbine engine, comprising:
    a heat shield panel attached to a combustor liner, the combustor liner having a plurality of primary apertures extending through the combustor liner and the heat shield panel having a plurality of heat shield apertures extending therethrough;
    an intermediary layer located between the combustor liner and the heat shield panel, the intermediary layer being spaced from the combustor liner and the intermediary layer being spaced from the heat shield panel, the intermediary layer including a plurality of secondary apertures extending through the intermediary layer, the plurality of heat shield apertures, the plurality of primary apertures and the plurality of secondary apertures each being in fluid communication with each other; and
    a plurality of solid pins extending upwardly and away from a surface of the intermediary layer towards a surface of the combustor liner, wherein particulate deposition occurs adjacent to the plurality of solid pins as airflow is redirected around the plurality of solid pins to flow through the plurality of secondary apertures in the intermediary layer.

2. The combustor as in claim 1, wherein the heat shield panel and the intermediary layer are removably mounted to the combustor liner by one or more attachment mechanisms.

3. The combustor as in claim 2, wherein the one or more attachment mechanisms are integrally formed with the heat shield panel.

4. The combustor as in claim 3, wherein the one or more attachment mechanisms are a bolt that extends from the heat shield panel through the intermediary layer and into a receiving portion or aperture of the combustor liner.

5. The combustor as in claim 1, wherein the combustor defines a combustion chamber, the combustion chamber including a combustion area within the combustion chamber and the heat shield panel partially encloses the combustion area within the combustion chamber of the combustor.

6. The combustor as in claim 1, wherein the combustor includes an inlet and an outlet through which air may pass.

7. The combustor as in claim 1, wherein the plurality of solid pins are arranged in an array on the surface of the intermediary layer.

8. The combustor as in claim 1, wherein a gap is located between a top of the plurality of solid pins and the surface of the combustor liner.

9. The combustor as in claim 8, wherein the plurality of solid pins are arranged in an array on the surface of the intermediary layer.

10. A gas turbine engine, comprising:

a compressor section;

a combustor fluidly connected to the compressor section;

a turbine section fluidly connected to the combustor, the combustor comprising:

a heat shield panel attached to a combustor liner, the combustor liner having a plurality of primary apertures extending through the combustor liner and the heat shield panel has a plurality of heat shield apertures extending therethrough;

an intermediary layer located between the combustor liner and the heat shield panel, the intermediary layer being spaced from the combustor liner and the intermediary layer being spaced from the heat shield panel, the intermediary layer including a plurality of secondary apertures extending through the intermediary layer, the plurality of heat shield apertures, the plurality of primary apertures and the plurality of secondary apertures each being in fluid communication with each other; and a plurality of solid pins extending upwardly and away from a surface of the intermediary layer towards a surface of the combustor liner, wherein particulate deposition occurs adjacent to the plurality of solid pins as airflow is redirected around the plurality of solid pins to flow through the plurality of secondary apertures in the intermediary layer.

11. The gas turbine engine as in claim 10, wherein the heat shield panel and the intermediary layer are removably mounted to the combustor liner by one or more attachment mechanisms.

12. The gas turbine engine as in claim 11, wherein the one or more attachment mechanisms are integrally formed with the heat shield panel.

13. The gas turbine engine as in claim 12, wherein the one or more attachment mechanisms are a bolt that extends from the heat shield panel through the intermediary layer and into a receiving portion or aperture of the combustor liner.

14. The gas turbine engine as in claim 10, wherein the combustor defines a combustion chamber, the combustion chamber including a combustion area within the combustion chamber and the heat shield panel partially encloses the combustion area within the combustion chamber of the combustor.

15. The gas turbine engine as in claim 10, wherein the combustor includes an inlet and an outlet through which air may pass.

16. The gas turbine engine as in claim 10, wherein the plurality of solid pins are arranged in an array on the surface of the intermediary layer.

17. The gas turbine engine as in claim 10, wherein a gap is located between a top of the plurality of solid pins and the surface of the combustor liner.

18. The gas turbine engine as in claim 17, wherein the plurality of solid pins are arranged in an array on the surface of the intermediary layer.

19. A method for capturing dirt particles in a combustor of a gas turbine engine, comprising:

securing a heat shield panel of the combustor to a combustor liner of the combustor, the combustor liner having a plurality of primary apertures extending through the combustor liner and the heat shield panel having a plurality of heat shield apertures extending therethrough;

securing an intermediary layer between the combustor liner and the heat shield panel, the intermediary layer being spaced from the combustor liner and the intermediary layer being spaced from the heat shield panel, the intermediary layer including a plurality of secondary apertures extending through the intermediary layer, the plurality of heat shield apertures, the plurality of primary apertures and the plurality of secondary apertures each being in fluid communication with each other; and capturing dirt particles with a plurality of solid pins extending upwardly and away from a surface of the intermediary layer towards a surface of the combustor liner, wherein particulate deposition occurs adjacent to the plurality of solid pins as airflow is redirected around the plurality of solid pins to flow through the plurality of secondary apertures in the intermediary layer.

20. The method as in claim 19, wherein the plurality of solid pins are arranged in an array on the surface of the intermediary layer.

* * * * *